Nov. 19, 1935. H. WESSON 2,021,342
VALVE ARRANGEMENT
Filed May 20, 1935
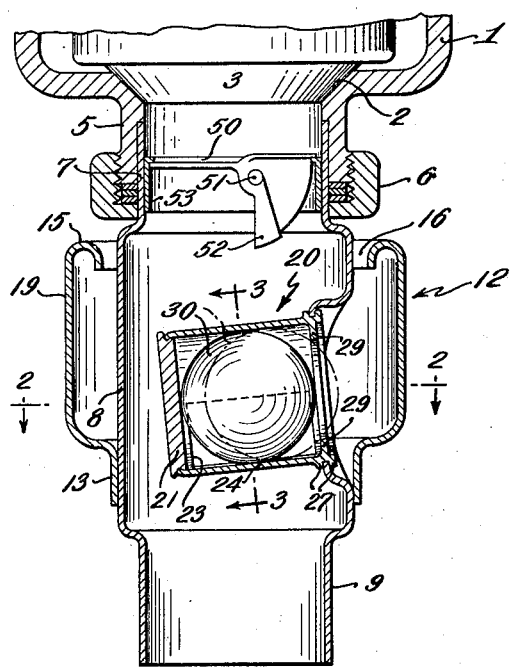
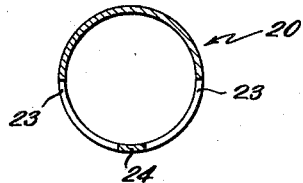
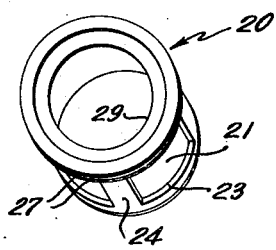
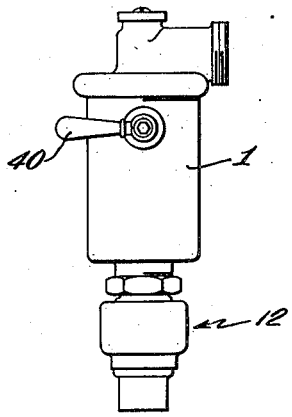
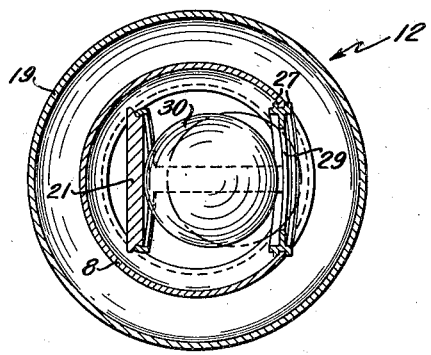
Inventor,
Harold Wesson,
by Roberts, Cushman & Woodberry.
Attys.

UNITED STATES PATENT OFFICE 2,021,342

VALVE ARRANGEMENT

Harold Wesson, Springfield, Mass., assignor to Smith and Wesson, Inc., Springfield, Mass., a corporation of Massachusetts Application May 20, 1935, Serial No. 22,292

16 Claims. (Cl. 4—70)

This invention relates to means for controlling the flow of fluids through conduits, particularly under conditions tending to create a vacuum in a conduit or passage. More particularly the present invention provides an improved arrangement having the general purposes of the device disclosed in my United States Patent No. 1,862,731.

As explained in that patent, the reversal of fluid flow through a conduit is often undesirable and may lead to serious results, for example, fluid passing through a conduit in one direction may become contaminated, and, if reverse flow occurs, all of the fluid in that conduit and in intercommunicating conduits may also become contaminated so as to be unfit for purposes for which it would otherwise be suitable. For example, this invention is particularly suited for employment with the flush valves of water closets. These flush valves are commonly connected with conduits which supply drinking water. In certain cases the removal of water from the flush valve has created a vacuum tending to cause water to be drawn backwardly through the valve and into the conduit supplying drinking water.

The primary object of the present invention is to afford a simple, compact and effective arrangement to prevent such a reversal of flow. For this purpose a valve may be provided to permit communication of the interior of the conduit with the surrounding atmosphere, especially when a vacuum tends to develop in the conduit which otherwise might cause reversal of fluid flow. In accordance with this invention, the vacuum preventing assembly may be arranged in compact relation to the conduit itself. Thus the valve proper may be disposed within a cage that is disposed in the conduit, while a basin to receive over-flowing liquid may be compactly disposed about the conduit. In practice an assembly of this type may conveniently be associated with the tail portion of a flush valve.

Preferably the vacuum preventing valve itself may comprise a ball check valve disposed in a suitable cage through which air may readily pass. This cage is preferably arranged so that the ball is supported upon a gradually inclined surface so that gravity normally tends to hold the valve in its open position. When the pressure within the conduit tends to close the valve, the ball rolls up the inclined surface and engages a seat surrounding an opening through which air normally may pass. Upon release of the pressure which holds the ball in this position, gravity causes the ball to return to its normal position. Surrounding the seat for the ball valve is an annular basin to catch any leakage of water which may pass through the valve opening. An important feature of this invention is the arrangement of the valve without springs and upon a gradually inclined surface. Thus the valve is very dependable since there is no danger of spring breakage and there is little tendency for the ball to stick at either end of its path. In the normal position of the ball the vacuum preventing valve is open so that under ordinary conditions there is an opening through which air may pass from the exterior atmosphere to the interior of the conduit, this opening only being closed momentarily during certain parts of the operating cycles of the flush valve.

In the accompanying drawing

Fig. 1 is a vertical section of a device constructed in accordance with this invention, a portion of an associated flush valve also being shown;

Figs. 2 and 3 are sections on lines 2—2 and 3—3 respectively of Fig. 1;

Fig. 4 is an isometric view of the valve cage; and

Fig. 5 is an elevation showing the device combined with a flush valve.

A vacuum preventing valve of the present type may be conveniently associated with any conduit wherein liquid normally flows in one direction but wherein reversal of fluid flow due to a vacuum would be objectionable. Ordinarily a valve of this type is used with a flush valve, such for example as the valve of the general type disclosed in my United States Patent No. 1,782,222, issued November 18, 1930.

In the accompanying drawing, the cylinder of a flush valve is designated by the numeral 1 such a cylinder being provided with an annular valve seat 2 against which the flush valve proper 3 normally seats. The lower part of the casing 1 is provided with a boss 5 to which the outlet conduit may normally be secured by a packing nut 6. In accordance with this invention, such an outlet duct may be of the general form shown in Fig. 1 having a portion 7 received within the boss 5 and having a chamber 8 of somewhat greater diameter below this portion, the chamber 8 in turn communicating with a continuation 9 which may conveniently be of the same diameter as the portion 7.

Surrounding the chamber 8 I may provide an annular basin 12 which provides an overflow preventer. This basin may have a lower flange 13 fitting about and secured to the outer surface of the chamber 8 and may have an upright wall 19 spaced from the same to cooperate therewith in defining an annular space or bowl. The upper part of the wall 19 is provided with a beaded annular flange 15 which is spaced from the wall of chamber 8 so that these parts define an annular air vent 16.

Located within the chamber 8 is a cage 20 which may be of generally cylindrical form having its axis inclined downwardly slightly toward the center of the chamber 8, as shown particularly in Fig. 1. The cage 20 may have an inner wall provided by a disk 21 to which the curved side wall of the cage is secured. This curved side wall may have a solid upper surface and generally rectangular openings 23 in its lower part which are spaced by a metal strip 24, that is integral with the wall of the cage. The inner end of the circular wall may be provided with flange portions 27 which engage a circular opening in a flattened portion of the wall of chamber 8, thus supporting the cage in place. A narrow annular flange 29 extends inwardly from this portion of the cage to provide a valve seat.

Disposed within the cage is a ball 30 which may conveniently be formed of sheet metal, being hollow and relatively light in weight. Due to the inclination of the cage 20 the ball normally engages the disk 21 as illustrated in full lines in Fig. 1, thus being spaced from the valve seat 29. When the ball is in this position, air may pass through the annular opening 16 and through the opening defined by the valve seat and thence through the openings 23 of the cage. Thus under normal conditions the interior of chamber 8 communicates with the surrounding air. When the pressure within the chamber 8 exceeds the exterior pressure, the ball 30 may roll along the inclined lower surface of the cage, and particularly on the strip 24 until it engages the seat 29, thus substantially precluding the flow of fluid into or out of the chamber 8.

Ordinarily a device of this type may be associated with a conventional flush valve which is normally closed so that no water is contained in the outlet conduit. Such a valve may be actuated by a handle, such as the handle 40, Fig. 5, to permit the flow of water through the outlet conduit including the chamber 8. When the handle is released the valve may move toward its closed position, means being provided to permit the gradual closing of the flush valve after the actuating handle has been released.

When a device of the character disclosed herein is associated with such a conventional flush valve, the operation of the assembly is substantially as follows: the flush valve 3 is lifted from the seat 2 thus permitting water under pressure to flow downwardly through the outlet duct, including the chamber 8. Under these conditions the momentary increase in pressure within the chamber produces a surge which causes the ball 30 to roll from its full to its dotted line position, thus closing the opening provided by seat 29. When the actuating handle is released the flush valve gradually closes and when the water pressure on the ball is relieved the ball valve opens by gravity. As the ball thus moves toward its position in engagement with the seat 29 a slight amount of water may flow outwardly into the annular chamber provided by member 9. However, as soon as the valve 3 returns to its normal position this water may drain into the lower part of the chamber 8 and flow downwardly into the chamber 9.

While the construction above described is effective for substantially all practical conditions the device can be made to relieve a more sudden and/or a wider change of pressure (e. g. a change from 80 pounds water pressure to a 22 inch vacuum) by inserting a check valve between the ball valve and the flush valve as illustrated at 59 in Fig. 1. This valve is pivoted at 51 in a ring 53 pressed into the upper neck 7 of tubular member 8 with its left-hand side seating upwardly and the right-hand side seating downwardly on the ring. By locating the pivot off-center with the left-hand side larger than the right-hand side, the valve opens in response to water pressure when the flush valve is opened; and by weighting the right-hand side, as indicated at 52, the valve closes by gravity when the flush valve is closed. When a vacuum develops in the supply line the check valve tends to prevent the suction from drawing the water from the toilet fixture; what little air leaks upwardly around the check valve is drawn through the ball-valve vent without substantial tendency to draw water from the toilet fixture.

It is evident that this invention provides a simple, compact arrangement permitting the vacuum to be broken in a conduit of the type disclosed herein and particularly in the outlet conduit associated with a flush valve. The arrangement of the annular member 19 prevents any objectionable leakage of water from the conduit and the arrangement of the gradually inclined cage 20 permits proper movement of the ball 30 between open and closed positions without undue shock and without tendency to stick at the normal position at the lower end of its path.

Furthermore, the openings which are provided to admit air may have a substantial area, as shown, for example, having an area of the order of the effective cross-section of the duct section 7, so that accidental clogging by dust or the like is avoided. By confining the openings 21 in the ball-valve casing to the lower side thereof there is little if any tendency for any foreign material in the water to become lodged in the casing.

It is furthermore to be noted that the ball valve and its casing are located within the tubular member 8. Thus an unusually compact, simple and dependable assembly is provided.

It should be understood that the present disclosure is for the purpose of illustration only and that this invention includes all modifications and equivalents which fall within the scope of the appended claims.

I claim:

1. A device of the class described, comprising a conduit section, an inclined cage in said section, one end of said cage being secured to the wall of said section, said wall providing an opening at said end of the cage, and a ball valve movable within the cage to close said opening, said section having a passage past said cage.

2. A device of the class described, comprising a conduit section, an inclined cage in said section, one end of said cage being secured to the wall of said section, said wall providing an opening at said end of the cage, and a ball valve movable within the cage to close said opening, and an annular basin member surrounding said section to receive liquid overflowing through said opening.

3. A device of the class described, comprising a conduit section, an inclined cage in said section, the upper end of said cage being secured to the wall of said section, said wall providing an opening at said end of the cage, and a ball valve movable within the cage to close said opening, the ball normally being maintained by gravity in the lower end of the cage and said section having a passage past said cage.

4. A device of the class described, comprising a conduit section, an inclined cage in said section, the upper end of said cage being secured to the wall of said section, said wall providing an opening at said end of the cage, and a ball valve movable within the cage to close said opening, the ball normally being maintained by gravity in the lower end of the cage, and an annular basin member surrounding said section to receive liquid flowing through said opening.

5. A device of the class described, comprising a conduit section, a gradually inclined cage in said section, the upper end of said cage being secured to the wall of said section, said wall providing an opening at said end of the cage, and a ball valve movable within the cage to close said opening, the ball normally being maintained by gravity in the lower end of the cage, said cage having a generally cylindrical wall, the lower part of said wall having openings, the upper part of said wall being solid and said section having a passage past said cage.

6. In combination with an integral part of a flush valve, an outlet duct for said valve, a valve arranged in said outlet duct, said duct having an opening which may be closed by the valve, when actuated by internal pressure, said last-named valve normally being spaced from the opening to permit air flow into the duct and said duct having a passage therethrough independent of said valve.

7. In combination with a flush valve, an outlet duct for said valve, a valve arranged in said outlet duct, said duct having an opening which may be closed by the valve, when actuated by internal pressure, said last-named valve normally being spaced from the opening to permit air flow through the opening, and an annular basin member in compact concentric relation to said duct and arranged to catch liquid overflowing through said opening.

8. In combination with a flush valve, an outlet duct for said valve, a generally cylindrical cage disposed in said section and having a slight downward inclination, the upper end of said cage being secured to the wall of said section, said wall providing an opening at that end of the cage, and a ball disposed within the cage and movable to close said opening, the ball normally engaging the lower end of said cage, and a basin member disposed adjoining said opening to receive liquid flowing through the same.

9. In combination with a flush valve, an outlet duct for said valve, a generally cylindrical cage disposed in said section and having a slight downward inclination, the upper end of said cage being secured to the wall of said section, said wall providing an opening at that end of the cage, and a ball disposed within the cage and movable to close said opening, the ball normally engaging the lower end of said cage, the lower part of the cylindrical wall of said cage providing an opening and said duct having a passage past said cage.

10. In combination with a generally cylindrical flush valve, an outlet duct in substantially concentric alignment with said valve, a cylindrical cage disposed in said duct below said valve and having a slight downward inclination, the upper end of said cage being secured to the wall of said duct, said wall providing an opening at that end of the cage, the upper surface of the cylindrical wall of the cage being solid and the lower surface thereof providing openings, and a ball disposed within the cage and movable to close said first-named opening, the ball normally engaging the lower end of said cage, and a cylindrical basin arranged compactly about the duct in the region of the cage to catch liquid overflowing from the first-named opening, the upper part of the basin cooperating with the wall of the duct in providing an annular port through which air may pass to said first-named opening and thence through the openings in the cage, the port, said first-named opening and the openings in the cake each providing areas for the passage of air of the order of the cross section of the duct.

11. A vacuum relief device for use in the water supply line from a flush valve to a toilet fixture, comprising a tubular member adapted to be fitted into and become a part of said line for delivering water to said fixture, the tubular member having a vent in the side thereof, a valve casing mounted inside said member, and a valve in said casing for closing said vent in response to internal pressure, said member having a passage therethrough independent of said valve.

12. A vacuum relief device for use in the water supply line from a flush valve to a toilet fixture, comprising a tubular member adapted to be fitted into and become a part of said line for delivering water to said fixture, the tubular member having a vent in the side thereof, a valve casing mounted inside said member, and a ball valve movable back and forth in said casing to open and close the vent, said casing extending downwardly from the vent so that the valve opens by gravity and said member having a passage therethrough independent of said valve.

13. A vacuum relief device for use in the water supply line from a flush valve to a toilet fixture, comprising a tubular member adapted to be fitted into and become a part of said line for delivering water to said fixture, the tubular member having a vent in the side thereof, a valve casing mounted inside said member, and a valve in said casing for closing said vent in response to internal pressure, said casing being closed on the top and having an opening in the bottom and said member having a passage past said casing.

14. A vacuum relief device for use in the water supply line from a flush valve to a toilet fixture, comprising a tubular member adapted to be fitted into and become a part of said line for delivering water to said fixture, the tubular member having a vent in the side thereof, a valve casing mounted inside said member, and a ball valve movable back and forth in said casing to open and close the vent, said casing extending downwardly from the vent so that the valve opens by gravity, said casing being closed on the top and having an opening in the bottom and said member having a passage past said casing.

15. A vacuum relief device for use in the water supply line from a flush valve to a toilet fixture, comprising a tubular member adapted to be fitted into and become a part of said line for delivering water to said fixture, a check valve for restraining upward flow through the member, a vent below the check valve, and a valve inside said member for closing said vent in response to internal pressure.

16. A vacuum relief device for use in the water supply line from a flush valve to a toilet fixture, comprising a tubular member adapted to be fitted into and become a part of said line for delivering water to said fixture, the tubular member having a vent in the side thereof, a valve casing mounted inside said member, a valve in said casing for closing said vent in response to internal pressure, and above said valve an independent check valve opening downwardly in response to pressure on the flush valve side and closing by gravity.

HAROLD WESSON.